(12) United States Patent
Etcheverry

(10) Patent No.: US 7,070,030 B2
(45) Date of Patent: Jul. 4, 2006

(54) RESILIENT AND DEFORMABLE MEMBER FOR ABSORBING KINETIC ENERGY

(76) Inventor: Gabriella Etcheverry, 33 Salem Ave., Toronto (CA) M6H 3C2

( * ) Notice: Subject to any disclaimer, the term of this patent is extended or adjusted under 35 U.S.C. 154(b) by 0 days.

(21) Appl. No.: 10/862,598

(22) Filed: Jun. 7, 2004

(65) Prior Publication Data

US 2004/0262829 A1 Dec. 30, 2004

Related U.S. Application Data

(60) Provisional application No. 60/476,029, filed on Jun. 5, 2003.

(51) Int. Cl.
*F16F 7/12* (2006.01)
(52) U.S. Cl. .................. 188/371; 296/187.12
(58) Field of Classification Search ............... 188/371, 188/268, 372; 267/116, 139, 140, 153, 35, 267/141; 296/146.6, 187.12, 187.05, 146.7; 293/108, 107, 109, 110, 120, 122, 128, 142, 293/135, 136, 134; 404/6–7; 256/13.1; 280/784, 751
See application file for complete search history.

(56) References Cited

U.S. PATENT DOCUMENTS

| | | | | |
|---|---|---|---|---|
| 2,890,904 A * | 6/1959 | Materi | .................. | 293/107 |
| 3,473,836 A * | 10/1969 | Halter | .................. | 293/107 |
| 3,494,607 A * | 2/1970 | Rusch | .................. | 267/116 |
| 3,680,851 A * | 8/1972 | Takada | .................. | 267/140 |
| 3,844,544 A * | 10/1974 | Keilholz | .................. | 267/64.22 |
| 3,936,090 A * | 2/1976 | Aya et al. | .................. | 296/146.6 |
| 4,010,940 A * | 3/1977 | Freyler | .................. | 267/201 |
| 4,017,076 A * | 4/1977 | Bai | .................. | 273/348.4 |
| 4,061,385 A * | 12/1977 | Schwartzberg | .................. | 293/107 |
| 4,369,608 A * | 1/1983 | Miura et al. | .................. | 52/309.9 |
| 4,451,518 A * | 5/1984 | Miura et al. | .................. | 428/137 |
| 4,890,877 A * | 1/1990 | Ashtiani-Zarandi et al. | .................. | 296/146.7 |
| 5,098,124 A * | 3/1992 | Breed et al. | .................. | 280/751 |
| 5,165,684 A * | 11/1992 | Pratt | .................. | 473/526 |
| 5,404,974 A * | 4/1995 | Thum et al. | .................. | 188/372 |
| 5,820,202 A * | 10/1998 | Ju | .................. | 296/146.6 |
| 5,857,734 A * | 1/1999 | Okamura et al. | .................. | 296/187.12 |
| 6,096,403 A * | 8/2000 | Wycech | .................. | 428/122 |
| 6,332,302 B1 * | 12/2001 | Asai | .................. | 52/731.6 |
| 6,386,625 B1 * | 5/2002 | Dukat et al. | .................. | 296/209 |
| 6,409,257 B1 * | 6/2002 | Takashina et al. | .................. | 296/209 |
| 2004/0262829 A1 * | 12/2004 | Etcheverry | .................. | 267/139 |

* cited by examiner

*Primary Examiner*—Robert A. Siconolfi
(74) *Attorney, Agent, or Firm*—Conley Rose, P.C.

(57) ABSTRACT

The present invention generally relates to devices and methods for absorbing kinetic energy. In particular, the present device is well suited for use in an automobile door, where it can be positioned for the purpose of absorbing the energy of a side-impact collision. In one embodiment, the device includes a first mass, a shell, and a plate, with the shell being disposed between the mass and plate. Both the first mass and shell are preferably constructed from deformable materials, allowing them to absorb energy during an impact. By absorbing the energy through deformation, the present device reduces the amount of energy that is transmitted through the door and thus reduces the amount of energy that may be transmitted to the occupants of the vehicle.

23 Claims, 3 Drawing Sheets

RESILIENT AND DEFORMABLE MEMBER FOR ABSORBING KINETIC ENERGY

CROSS-REFERENCE TO RELATED APPLICATIONS

This application claims priority to U.S. Provisional Application Ser. No. 60/476,029, filed Jun. 5, 2003, entitled "Squash Ball Car Door."

STATEMENT REGARDING FEDERALLY SPONSORED RESEARCH OR DEVELOPMENT

Not applicable.

FIELD OF THE INVENTION

The present invention generally relates to devices and methods for absorbing kinetic energy. More particularly, some of the embodiments of the present invention relate to devices comprising resilient materials capable of deformation and methods of using such devices.

BACKGROUND OF THE INVENTION

The ideal vehicle crash would, of course, be no crash at all. But, assuming there is going to be a crash, it is desirable to maximize possible chances of human survival, collectively utilizing safety systems in the vehicle to allow for the smoothest crash possible.

Surviving a vehicle crash involves minimizing kinetic energy. When a passenger's body is moving at 35 mph, it has a certain amount of kinetic energy. After the crash, when the passenger comes to a complete stop, he has zero kinetic energy. To minimize risk of injury, it is desirable to remove the kinetic energy as slowly and evenly as possible. Some of the safety systems in vehicles help do this.

Ideally, a vehicle has seatbelt pretensioners and force limiters; they both tighten up the seatbelts very soon after the car hits a barrier, but before an airbag deploys. The seatbelt can then absorb some of the passenger's energy as he moves forward towards the airbag. Milliseconds later, the force in the seatbelt holding the passenger back would start to hurt him, so the force limiters kick in now, making sure the force in the seatbelts does not get too high. Next, the airbag deploys and absorbs some more of the passenger's forward motion while protecting the passenger from hitting anything hard.

In this hypothetical crash, the safety systems in the car all worked together to slow the passenger down. If the passenger did not wear a seatbelt, then the first stage of protection is lost and he is more likely to be injured when he collided into the airbag. Many cars have seatbelt pretensioners and force limiters, but there are some even more exciting safety improvements being developed.

Recently, it seems like air bags have become commonplace in most cars. And if they help prevent passengers from hitting hard objects during a collision, they are doing their job. But, there is always room for improvement. Right now (and in the foreseeable future) the emphasis on safety equipment is to make it "smarter."

The most recent advancement in safety equipment is known as a smart air bag. These air bags can deploy with different speeds and pressures, depending on the weight and seating position of the occupant, and also on the intensity of the crash. Unfortunately, the deployment of an air bag is expensive and, in some cases, can cause serious injury and even death to the driver or passenger.

Until recently, most of the strides made in auto safety were in front and rear impacts, even though 40 percent of all serious injuries from accidents are the result of side impacts, and 30 percent of all accidents are side-impact collisions. Many carmakers have responded to these statistics (and the resulting new standards) by improving doors, door frames and floor and roof sections. But cars that currently offer side air bags represent the new wave of occupant protection. Engineers say that designing effective side air bags is much more difficult than designing front air bags. This is because much of the energy from a front-impact collision is absorbed by the bumper, hood and engine, and it takes almost 30 to 40 milliseconds before it reaches the car's occupant. In a side impact, only a relatively thin door and a few inches separate the occupant from another vehicle. This means that door-mounted side air bags must begin deploying in a mere five or six milliseconds.

In light of the difficulty of designing effective side air bags, the device of the present invention seeks to provide an effective and affordable alternative to air bags.

SUMMARY OF THE INVENTION

In accordance with the spirit of the present invention, devices comprising resilient materials capable of deformation are described herein. For example, in one embodiment, a device includes a first mass, a shell, and a plate, with the shell being disposed between the mass and plate. Both the first mass and shell are preferably constructed from deformable materials. Without wishing to be bound by a theory, it is believed that when a force (impact) is applied to the first mass, first mass moves toward the plate, contacting the shell. This deforms the shell, thereby absorbing energy from the impact.

Methods of use for device are also described herein. For example, the device can be used to absorb and dissipate kinetic energy in side-impact vehicle collisions by placing it inside car doors. These and other embodiments of the present invention, as well as their features and advantages, will become apparent with reference to the following detailed description.

BRIEF DESCRIPTION OF THE DRAWINGS

For a more detailed understanding of the preferred embodiments of the invention, reference will now be made to the accompanying drawings, wherein.

NOTATION AND NOMENCLATURE

Figure 1:
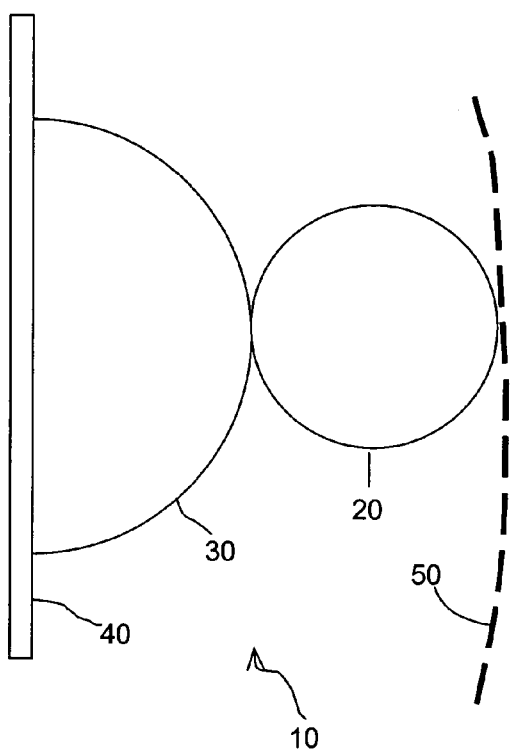
FIG. 1 is a side view of the device constructed in accordance with a preferred embodiment of the present invention.

In the following discussion and in the claims, the terms "including" and "comprising" are used in an open-ended fashion, and thus should be interpreted to mean "including, but not limited to . . . ." Certain terms are used throughout the following description and claims to refer to particular system components. For example, resilient is intended to mean capable of withstanding shock without permanent deformation or rupture. Additionally, deformation is intended to mean alteration in the shape or dimensions of an object as a result of the application of stress to it.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

DETAILED DESCRIPTION OF THE PREFERRED EMBODIMENTS

The present invention generally relates to devices comprising resilient materials capable of deformation and methods of using such device. Although many detailed embodiments of the present invention will be discussed herein, the present device is particularly well suited for use in an automobile door, where it can be positioned for the purpose of absorbing the energy of a side-impact collision. By absorbing the energy through deformation, the present device reduces the amount of energy that is transmitted through the door and thus reduces the amount of energy that may be transmitted to the occupants of the vehicle. While the present device is described in terms of its use in an automobile door, it will be understood that the energy absorbing properties of the present invention can be used to advantage in any application where it is desired to provide a compact mechanism for absorbing kinetic energy.

Figure 2:
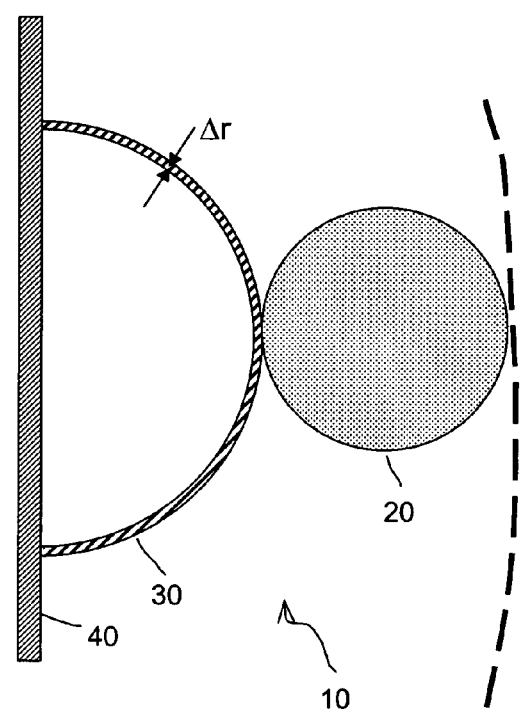
FIG. 2 is a cross section of the device shown in FIG. 1.

According to a first preferred embodiment, the present device comprises a deformable first mass, a resilient hemispherical shell, and an impact plate. Referring initially to FIGS. 1 and 2, one possible configuration 10 for the components of the device is shown. Specifically, a first mass 20 is positioned adjacent to a resilient hemispherical shell 30, which in turn is positioned such that its planar surface rests on an impact plate 40. In some embodiments, impact plate 40 fits inside hemispherical shell 30, effectively having the same radius as hemispherical shell 30. The device or assembly 10 is preferably positioned within a system that is vulnerable to collapse. By way of example, the device 10 may be disposed in a car door, with the outer surface of first mass 20 contacting the inside surface 50 of the outer door panel (shown in phantom). Alternatively, device 10 may be disposed in the dash board of a car.

First mass 20 is preferably constructed of a substantially rigid, but deformable, material such as a polystyrene composite comprising rubber fibers in a polymer matrix (e.g., high impact polystyrene (HIPS)). Alternative materials include, but are not limited to, other polymer foams, with or without additional fiber material, foamed and unfoamed elastomeric compositions, and other resilient materials.

It may be preferable to use a material having a high energy of deformation. For example, in some embodiments, it may preferable for first mass 20 to have a modulus of elasticity of between about 1 and 10 GPa, with about 2.0 GPa being particularly preferred. Additionally, while it may be preferred for first mass 20 to comprise a substantially solid material, other materials, such as porous structures, foams, and honeycombs may alternatively be used.

In some embodiments, first mass 20 is spherical. It is not necessary that first mass 20 be spherical, however; any geometric shape, including but not limited to ovoid, oblong, elliptical, right cylinder, rectangular prism, truncated pyramid, or truncated cone, or any non-geometric shape can be used. In some embodiments, it is preferred, but not necessary, that the first mass be symmetric about an axis that is parallel to the axis of the assembled device.

Resilient hemisphere 30 is preferably constructed of a highly resilient and deformable material such as synthetic (butyl) rubber. Alternative materials include, but are not limited to, polymers (especially cross-linked polymers) and other resilient materials.

Unlike first mass 20, hemisphere 30, preferably has a low energy of deformation. Consequently, hemisphere 30 preferably has a modulus of elasticity of less than about 1 GPa. For example, when hemisphere 30 comprises rubber, it has a modulus of elasticity of between about 0.01 GPa and 0.10 GPa, with about 0.08 GPa being particularly preferred. Additionally, while hemisphere 30 may comprise a substantially solid material, it is often more preferable for hemisphere 30 to comprise an outer shell filled with a fluid.

In some embodiments, hemisphere 30 comprises a shell of butyl rubber of about 0.1 cm thick. The overall diameter of hemisphere 30 is preferably greater than the diameter of first mass 20 and is preferably between about 2 and 20 cm. Likewise, the thickness $\Delta r$ of the hemisphere 30 is preferably uniform and preferably between about 0.03 cm and 1 cm or more. Alternatively, in some embodiments, the shell may have internal or external ridges or reinforcements, or may be otherwise non-uniform. Likewise, while a hemispherical configuration is preferred, other shell shapes can be used.

Impact plate 40 is preferably constructed of a lightweight and rigid, yet plastically deformable material. For example, in some embodiments, impact plate 40 comprises a soft metal such as an aluminum alloy (e.g., 6061). Accordingly, impact plate 40 preferably has a modulus of elasticity of between about 20 and 200 GPa, with about 70 GPa being particularly preferred.

While not limited to any specific material, plate 40 serves to give structure to hemisphere 30, and therefore, should have sufficient strength to support the components of device 10 in the desired position. Referring still to FIGS. 1 and 2, in a preferred embodiment, the edges of shell 30 are sealed to plate 40. In this embodiment, any fluid, including but not limited to air, inert gas, water or the like, can be sealed inside the volume of shell 30. Having a fluid within the volume of shell 30 is particularly desirable because the fluid may absorb additional kinetic energy during impact (e.g., a collision).

In some embodiments, first mass 20, hemisphere 30, and plate 40 are assembled and held in their respective positions using an adhesive. Weak adhesives are preferred as opposed to stronger cement-like ones because during impact, it is desirable for first mass 20 to be able to move freely from hemisphere 30.

Alternatively, any suitable fastening means can be used to join the components. In some embodiments, such that the integral shell and plate discussed below, two or more of the components may be constructed of the same material. Similarly, any two or more of the components can be constructed as a single, monolithic piece.

Deployment

The assembly of the present invention can be deployed wherever it is desired to absorb impact energy. For example, it may be advantageous to deploy one or several of the present assemblies inside the doors of passenger automobiles. An assembly could be mounted within the door at one or more key impact points, or an array of assemblies could be mounted so as to cover a larger portion of the door's inner surface area.

Figure 4:
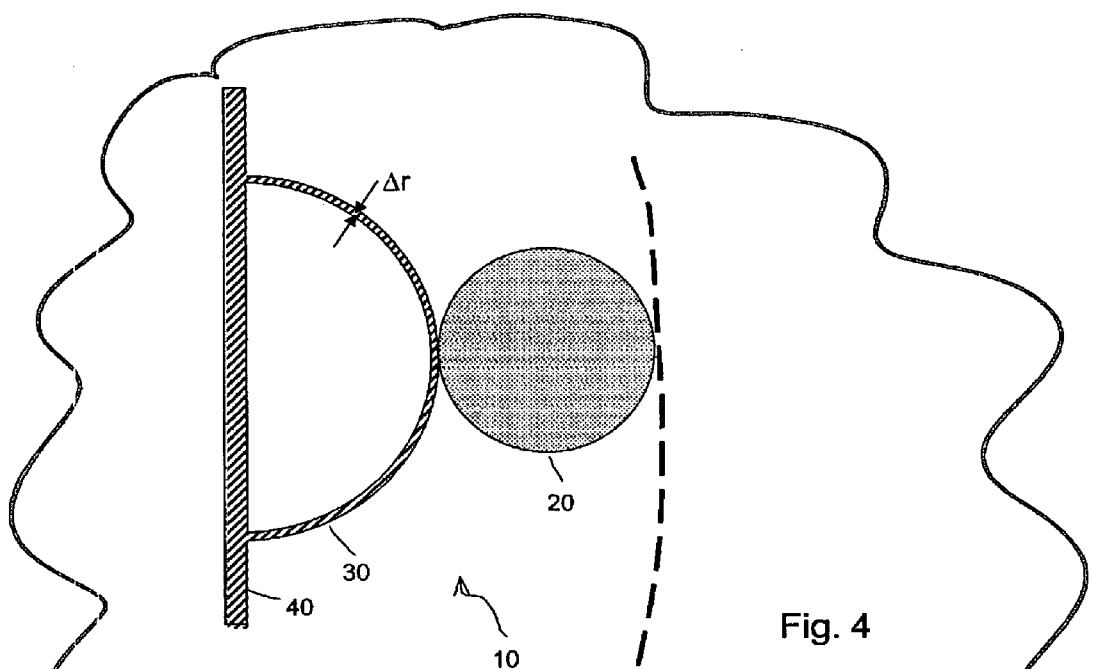
FIG. 4 is a cross section of an alternative embodiment of the device shown in FIG. 1.
Figure 5:
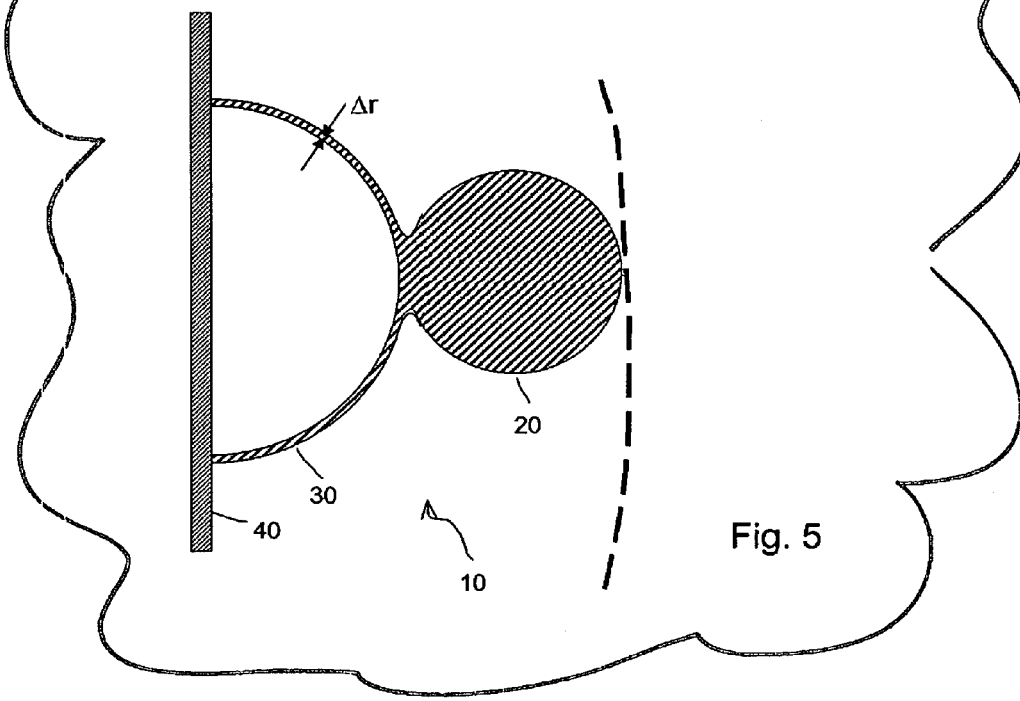
FIG. 5 is a cross section of an alternative embodiment of the device shown in FIG. 1.

In other preferred embodiments, plate 40 and shell 30 are formed as an integral piece as shown in FIG. 4, preferably from a resilient material, such that the volume of shell 30 is enclosed and a substantially flat back-face is formed. As with plate 40, this back-face can be positioned as desired so as to be supported on and/or bear on a desired surface, such as an inner surface of an automobile door. In other embodiments, mass 20 and shell 30 are formed as an integral piece as shown in FIG. 5.

The present assembly can be sized and deployed such that it is substantially uncompressed until impact. Alternatively, the assembly can be sized and deployed such that it is slightly or substantially compressed prior to impact, so as to apply a pre-load to the object in which it is deployed.

Impact

Figure 3:
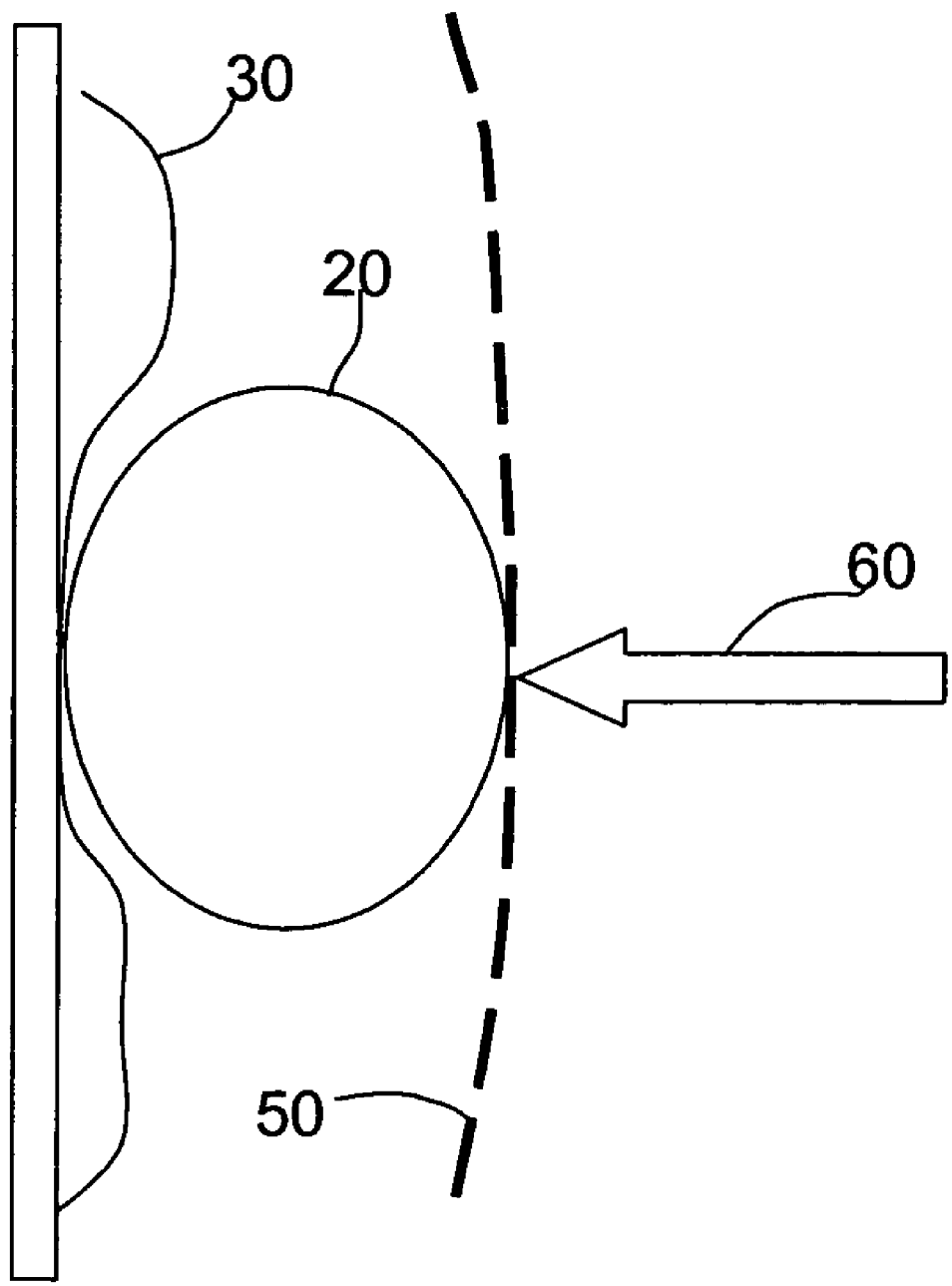
FIG. 3 is a side view of the device of FIG. 1 in a collapsed state.

Referring now to FIG. 3, when, for example, the vehicle in which the present device 10 strikes or is struck by another object, a force represented by arrow 60 may act on device 10. In response to the force, device 10 deforms as shown in FIG. 3. Namely, first mass 20 both deforms and accelerates toward hemisphere 30, while hemisphere 30 is, in turn, deformed such that its center of mass shifts toward plate 40. Each of these events requires energy and thus absorbs kinetic energy from the impact.

In the embodiment in which impact plate 40 fits inside hemispherical shell 30, during collisions, the air inside the shell pushes down on the plate, thereby forming a tight seal. In addition, in the embodiment in which the edges of shell 30 are sealed to plate 40, if a gas is present in the volume of shell 30, it will be compressed as shell 30 collapses, thus removing additional energy from the impact. If a fluid is present in the volume of shell 30, the assembly may be constructed such that the volume of shell 30 is released and the emergence of the fluid therefrom absorbs some of the impact energy.

Benefits

A number of benefits are associated with the present device when used to absorb kinetic energy in an automobile collision. Firstly, the geometry of the device promotes close packing of multiple units within a car door. Therefore, after an automobile accident, the car owner need only replace the units that were disrupted during the collision.

Secondly, the materials (polystyrene and butyl rubber) of the present device are fire retardant. Because of the abundance of electrical components in automobiles (and their doors), it is highly desirable to employ fire retardant materials whenever possible in order to prevent unnecessary fires from occurring.

Thirdly, when built using the recommended materials and recommended design, this device has been shown to be highly cost effective as well as quite functional with current car door designs (e.g., the device does not interfere with the functionality of the car by adding significant amounts of weight to the car).

Fourthly, this device may be used in conjunction with current side impact safety devices (including air bags and side impact beams). So in this way, the device is compatible with current car door design and no adjustments need to be made so as to incorporate the device into the door.

While preferred embodiments of this invention have been shown and described, modification thereof can be made by one skilled in the art without departing from the spirit or teaching of this invention. The embodiments described herein are exemplary only and are not limiting. Many variations and modifications of the compositions and methods are possible and are within the scope of this invention. For example, it is completely within the spirit and scope of the present invention for the sizes and shape of the parts of the device to be varied depending on the function the device is to fulfill (e.g., a hollow spherical shell could be used as long as it is airtight). Accordingly, the scope of protection is not limited to the embodiments described herein, but is only limited by the claims, the scope of which shall include all equivalents of the subject matter of the claims.

APPENDIX

Suggested Materials
  Polystyrene HIPS (The Contact Sphere)
    Density: 1.08 g/cm3
    Modulus of Elasticity: 2.1 GPa
    Composite material made of Polystyrene Matrix with Rubber injected into it to remove the material's brittleness.
  Butyle Rubber EPDM (The Hemispherical Shell)
    Density: 0.98 g/cm3
    Modulus of Elasticity: 0.08 GPa
    Long repeated chain polymer with sulphur added to cause cross-linking.
  Aluminum Alloy 6061, T651 (The Plate)
    Density: 2.70 g/cm3
    Modulus of Elasticity: 69 GPa
    Composite material mixed with Magnesium, Silicon, Copper, and Chromium.
Other Data Used in Calculations
  *These values can be adjusted to any door.
    Length of door: 1.06 m
    Height of the solid part of the door: 0.76 m
    Height of the rest of the door: 0.54 m
    Width of the door: 0.18 m

THE MECHANISM

Calculations

1. The thickness of the hemispherical shell was calculated using the different Modulus' of Elasicity. In the following formula, the thickness of the Shell is seen as the cross sectional area of The Matrix 1) $E_{ct} = \dfrac{E_m E_f}{V_m E_f + V_f E_m}$ Solving for $V_m$:
  a) $E_{ct}(V_m E_f + V_f E_m) = E_m E_f$ b) $V_m E_f + V_f E_m = \dfrac{E_m E_f}{E_{ct}}$ c) $V_m E_f = \dfrac{E_m E_f}{E_{ct}} - V_f E_m$ d) $V_m = \dfrac{E_m}{E_{ct}} - \dfrac{V_f E_m}{E_f}$ 2) Substituting in for $V_m=A_m/A_c$ and for $V_f=A_f/A_c$ it is seen that:

$$\frac{A_m}{A_c} = \frac{E_m}{E_{ct}} - \frac{A_f E_m}{A_c E_f} \quad A_m = \frac{A_c E_m}{E_{ct}} - \frac{A_f E_m}{E_f}$$

3) Substituting $A_c=lh$, $A_m=\pi(r_2^2-R_1^2)$ and $A_f=\pi r_3^2$;

$$\frac{\pi}{4}(r_2^2 - r_1^2) = \frac{(lh)E_m}{E_{ct}} - \frac{(\pi r_3^2)E_m}{E_f}$$

This becomes;

$$r_2^2 - r_1^2 = \frac{4}{\pi}\left[\frac{(lh)E_m}{E_{ct}} - \frac{(\pi r_3^2)E_m}{E_f}\right]$$

Solving for $r_1$:

$$r_1^2 = r_2^2 - \frac{4}{\pi}\left[\frac{(lh)E_m}{E_{ct}} - \frac{(\pi r_3^2)E_m}{E_f}\right]$$

$$r_1 = \sqrt{r_2^2 - \frac{4}{\pi}\left[\frac{(lh)E_m}{E_{ct}} - \frac{(\pi r_3^2)E_m}{E_f}\right]}$$

This is the GENERALIZED FORM and can be used to solve for the appropriate thickness of the rubber shell given that you know the mechanical properties of the materials that will be used in the mechanism. This mechanism can be used in ANY DOOR, given any thickness and any materials.

4) Substituting in the different known values, $r_1$ can be solved for:

$$r_1^2 = (0.09 \text{ m})^2 - \frac{4}{\pi}\left[\frac{(1.06 \text{ m})(0.76 \text{ m})(0.08 \text{ GPa})}{69 \text{ GPa}} - \frac{\pi(0.045 \text{ m})^2(0.08 \text{ GPa})}{2.1 \text{ GPa}}\right]$$

$r_1^2=(0.09m)^2-0.00088067m^2$ $r_1^2=0.0081m^2-0.00088067m^2$ $r_1^2=0.007219328m^2$ $\therefore r_1=0.084967m$ 5) From this value the shell thickness can be found:

$\Delta r=r_2-r_1=0.09m-0.084967m=0.005033m$ or 5.033mm.

2. The next quantity that was calculated was the volume of the Hollow inside of the Hemispherical Shell as follows:

$$V = \frac{\frac{4}{3}\pi r_1^3}{2} \quad V = \frac{\frac{4}{3}\pi(0.084967 \text{ m})^3}{2}$$

$V=0.001285 m^3$ $V=1.285$ L

3. Using this volume and the ideal gas law, the mass of air present in the Hollow Hemispherical Shell was calculated. For this calculation, the Hemispherical Shell was assumed to be under the pressure of 1 atmosphere and 23° C.

$$n = \frac{PV}{RT} \quad n = \frac{(1\text{atm})(1.285 \text{ L})}{(0.0821 \text{ L}\cdot\text{atm}/\text{K}\cdot\text{mol})(296 \text{ K})}$$

$n=0.0529$ mol 1 mol air $\approx$32 g/mol (molar mass of $O_2$)

$\therefore 0.0529 mol=1.6928$ g

4. The next calculation that was done to calculate the volume of the Hemispherical Shell and using that value the mass of the Rubber in one mechanism was calculated.

$$V = \frac{\frac{4}{3}\pi(r_2^3 - r_1^3)}{2} \quad V = \frac{\frac{4}{3}\pi[(0.09 \text{ m})^3 - (0.084967 \text{ m})^3]}{2}$$

$V=2.4209\cdot 10^{-4} m^3$ $V=242.09 cm^3$

Mass of Rubber (M)=Volume of Rubber (V)×Density of Rubber (D)

$M=V\times D$ $M=(242.09$ cm$^3)(0.98$ g/cm$^3)$ $M=237.25$ g

5. The next required calculated was the volume and mass of the Polystyrene Sphere.

$V=4/3\pi r_3^3$ $V=4/3\pi(0.045m)^3$ $V=3.817\cdot 10^{-4} m^3$ $V=381.704$ cm$^3$ Mass of Polystyrene (M)=Volume Polystyrene (V)× Density Polystyrene (D)

$M=V\times D$ $M=(381.704$ cm$^3)(1.08$ g/cm$^3)$ $M=412.24$ g

6. Now that the masses of the individual components are known, it is possible to calculate the final total mass.

Mass of Mechanism = Mass of Polystyrene + Mass of Rubber Shell + Mass of Air inside Shell = 412.24 g + 237.25 g + 1.6928 g = 651.18 g 7. This vale can now be used to calculate the fastest constant velocity that this mechanism can attain when being pushed by a constant external force. In this situation, it is assumed that a second car weighing 3000 kg is impacting a first stationary vehicle at an angle of 90°.

I. Using the Work-Energy Theorem, because the second car is colliding with the first car at 90° all of the second car's energy is turned into work done on the door of the first car. Therefore, The velocity of the mechanism can be found as follows:

Work=Kinetic Energy

Force×$d$=½×$M$×(Velocity)$^2$ $$(\text{Velocity})^2 = \frac{2 \times \text{Force} \times d}{M}$$

$$(\text{Velocity})^2 = \frac{2(4.0 \cdot 10^6 \text{ N})(0.18 \text{ m})}{0.65118 \text{ kg}}$$

(Velocity)$^2$=2.21137·10$^6$ $m^2/s^2$

Velocity=1.49·10$^3$ $m/s$

II. This velocity represents the rate at which the mechanism will collapse while a constant external force is being applied. What must be noted is that the second the external for is removed, the rubber shell will function in a way that it will want to push the outer surface of the door back to its original position. The shell will act in this way because of its high degree of elasticity.

III. What must also be noted is that the above situation denotes when there is only one mechanism placed inside the car door. The ideal situation would be when there is more than one mechanism inside the door. In this way, the mechanisms will collapse at a slower velocity and more energy will be absorbed and dissipated as the door deforms.

IV. What is essential to understanding the setup of this mechanism is that it does not behave as three separate parts. The mechanism behaves as one system as soon as an external force is applied.

What is claimed is:

1. A car door including at least one device for absorbing kinetic energy, the kinetic energy-absorbing device comprising:
   a spherical first mass comprising a deformable material;
   a hemispherical shell comprising a deformable material and defining a volume; and
   a plate,
   said shell being disposed between said mass and said plate such that a force applied to said mass deforms said mass and causes said first mass to move toward said plate, thereby also deforming said shell.

2. The car door according to claim 1 wherein the shell is sealed to the plate so as to encapsulate said volume.

3. The car door according to claim 2 wherein the volume of the shell is filled with a liquid.

4. The car door according to claim 1 wherein the volume of the shell is filled with a gas.

5. The car door according to claim 1 wherein the shell and the plate are formed as a single piece.

6. The car door according to claim 1 wherein the shell and the first mass are formed as a single piece.

7. The car door according to claim 1 wherein the first mass has a modulus of elasticity of about 2.0 GPa.

8. The car door according to claim 1 wherein the shell has a modulus of elasticity of less than about 1 GPa.

9. The car door according to claim 1 wherein the shell has a modulus of elasticity of between about 0.01 GPa and 0.10 GPa.

10. The car door according to claim 1 wherein the shell has a modulus of elasticity of about 0.08 GPa.

11. The car door according to claim 1 wherein the shell is between about 0.03 and 1 cm thick.

12. The car door according to claim 1 wherein the shell is about 0.1 thick.

13. The car door according to claim 1 wherein the shell has a diameter of between about 2 and 20 cm.

14. The car door according to claim 13 wherein said shell has a diameter of about 9 cm.

15. The car door according to claim 1 wherein the plate has a modulus of elasticity of between about 20 and 200 GPa.

16. The car door according to claim 15 wherein the plate has a modulus of elasticity of about 70 GPa.

17. The car door according to claim 1 wherein said first mass, said shell and said plate are maintained as an assembly by an adhesive.

18. The car door according to claim 1 wherein said first mass, said shell and said plate are maintained as an assembly by at least one fastener.

19. A method for absorbing kinetic energy in a car door, comprising placing the device of claim 1 within the door.

20. A car door including at least one device for absorbing kinetic energy, the kinetic energy-absorbing device comprising:
   a spherical first mass comprising a deformable material;
   a plate; and
   a hemispherical shell comprising a deformable material and being formed integrally with said plate so as to define with said plate a volume, said volume being filled with a liquid;
   said shell being disposed between said mass and said plate such that a force applied to said mass deforms said mass and causes said first mass to move toward said plate, thereby also deforming said shell.

21. The car door according to claim 20 wherein the shell is sealed to the plate so as to encapsulate said volume.

22. The car door according to claim 20 wherein the shell and the plate are formed as a single piece.

23. The car door according to claim 20 wherein the shell and the first mass are formed as a single piece.

* * * * *